United States Patent
Knott

(10) Patent No.: US 6,343,461 B1
(45) Date of Patent: Feb. 5, 2002

(54) TELESCOPINGLY ADJUSTABLE LAWN TRIMMER ATTACHMENT APPARATUS FOR RIDING LAWN MOWERS

(76) Inventor: Gregg Knott, 7412 Cedar Hill, Tuttle, OK (US) 73089

( * ) Notice: Subject to any disclaimer, the term of this patent is extended or adjusted under 35 U.S.C. 154(b) by 0 days.

(21) Appl. No.: 09/625,136

(22) Filed: Jul. 25, 2000

(51) Int. Cl.$^7$ .................. A01D 34/03; A01D 34/43; A01D 34/64
(52) U.S. Cl. .................... 56/16.9; 56/11.6
(58) Field of Search ............... 56/16.9, 17.1, 56/11.6, 12.7

(56) References Cited

U.S. PATENT DOCUMENTS

| | | | | |
|---|---|---|---|---|
| 2,538,230 A | * | 1/1951 | Boggs | 56/12.7 |
| 2,676,447 A | * | 4/1954 | Asbury | 56/16.9 |
| 2,771,730 A | * | 11/1956 | True | 56/11.6 |
| 2,909,021 A | * | 10/1959 | McLane | 56/16.9 |
| 3,183,652 A | * | 5/1965 | Pratt | 56/13.7 |
| 3,490,213 A | * | 1/1970 | Pinto | 56/16.9 |
| 3,494,116 A | * | 2/1970 | Lempke | 56/202 |
| 3,668,845 A | * | 6/1972 | Parker | 56/11.6 |
| 3,686,839 A | * | 8/1972 | Lambert | 56/11.6 |
| 3,693,334 A | * | 9/1972 | Lowery | 56/16.9 |
| 4,312,095 A | * | 1/1982 | Mullins | 56/400.14 |
| 4,406,113 A | * | 9/1983 | Mullins | 56/400.16 |
| 4,453,372 A | * | 6/1984 | Remer | 56/13.7 |
| 4,770,440 A | * | 9/1988 | Lander | 280/760 |
| 4,787,197 A | * | 11/1988 | Schweigert | 56/202 |
| 4,922,696 A | * | 5/1990 | Burns et al. | 56/202 |
| D311,009 S | * | 10/1990 | Wilkins | D15/14 |
| 5,156,218 A | * | 10/1992 | Metzler et al. | 172/15 |
| 5,167,108 A | * | 12/1992 | Bird | 56/13.7 |
| D334,200 S | * | 3/1993 | Clifton | D15/17 |
| 5,226,284 A | * | 7/1993 | Meehleder | 56/11.6 |
| 5,934,055 A | * | 8/1999 | Steele | 56/16.7 |

* cited by examiner

*Primary Examiner*—Thomas B. Will
*Assistant Examiner*—Árpád Fábián Kovács
(74) *Attorney, Agent, or Firm*—John D. Gugliotta

(57) ABSTRACT

A lawn trimmer attachment for riding lawn mowers having a disc-shaped lawn trimmer having lawn cutting line attached to a pulley assembly mounted to the underside of the mower deck. Power is supplied by conventional belts taking off power from the riding lawn mower engine.

14 Claims, 4 Drawing Sheets

TELESCOPINGLY ADJUSTABLE LAWN TRIMMER ATTACHMENT APPARATUS FOR RIDING LAWN MOWERS

RELATED APPLICATIONS

The present invention was first Disclosure Document No. 468,920 filed on Feb. 10, 2000. There are no previously filed, nor currently any co-pending applications, anywhere in the world.

BACKGROUND OF THE INVENTION

1. Field of the Invention

The present invention relates generally to lawn trimmer attachments and, more particularly, to a lawn trimmer attachment apparatus for riding lawn mowers.

2. Description of the Related Art

Many Americans spend countless hours maintaining and beautifying their lawns and landscape. As a matter of pride and personal expression, these people manicure their grass, plant and maintain flowers, shrubs, bushes and trees all for the sake of enhancing the aesthetic qualities of their property. On properties with large areas of grass to cut, riding mowers are very popular. They allow their users to cut relatively large areas of grass in a minimal amount of time while allowing the rider to sit in comfort. However, these mowers, due to their size are not very adept at cutting close to objects such as fences, buildings, trees and the like. This usually requires the user to go back afterwards with a string type trimmer thus removing the benefits of being able to sit down and save time that the riding mower provided.

Accordingly, there exists a need for a means by which grass trimming duties can be accomplished at the same time grass is being cut by a riding mower in a manner which is quick, easy, and effective. The development of the lawn trimmer attachment apparatus for riding lawn mowers fulfills this need.

A search of the prior art did not disclose any patents that read directly on the claims of the instant invention; however, the following references were considered related. The following patents disclose a grass collecting/utility cart for riding lawn mowers: U.S. Pat. No. 4,922,696 issued in the name of Burns et al.; U.S. Pat. No. 4,787,197 issued in the name of Schweigert; and U.S. Pat. No. 3,494,116 issued in the name of Lempke.

The following patents describe the ornamental design of a lawn trimmer attachment for a riding lawn mower: U.S. Pat. No. D 334,200 issued in the name of Clifton.; and U.S. Pat. No. D 311,009 issued in the name of Wilkins.

U.S. Pat. No. 5,934,055 issued in the name of Steele discloses a lawn aeration device for attachment to a riding lawn mower.

U.S. Pat. No. 5,761,887 issued in the name of Hanson describes a platform attachment for a lawn mower.

U.S. Pat. No. 4,770,440 issued in the name of Landor discloses a combination utility attachment and stand for riding lawn mowers.

The following patents describe a mobile lawn rake attachment for riding lawn mowers: U.S. Pat. No. 4,406,113 issued in the name of Mullins; and U.S. Pat. No. 4,312,095 issued in the name of Mullins.

Consequently, a need has been felt for providing a lawn trimmer attachment apparatus for riding lawn mowers for cutting and trimming stray grass and weeds while cutting regular grass with a riding mower at the same time in a manner which is quick, easy and effective.

SUMMARY OF THE INVENTION

Therefore, it is an object of the present invention to provide a lawn trimmer apparatus which can be easily attached to riding mowers.

It is another object of the present invention to provide a lawn trimmer apparatus which allows a rider to trim stray grass and weeds while simultaneously cutting grass when driving the riding mower.

It is still another object of the present invention to provide a device which is readily adaptable with all types and models of riding mowers.

It is another object of the present invention to provide a device which can be supplied as original equipment with a riding mower.

It is another object of the present invention to provide a device which is available in kit form for adding to existing riding mowers.

Briefly described according to one embodiment of the present invention, a lawn trimmer attachment for riding lawn mowers is provided for accomplishing grass trimming duties at the same time grass is being cut by a riding mower.

A pulley support apparatus which includes a cylindrical, telescoping, T-shaped center member and a pair of C-shaped pulley support members is designed and configured so as to be removably attached to the mower deck of a riding lawn mower. The center member includes a stem welded perpendicularly along a linearly elongated centerline of an underside of the center member for being telescopically received by a mounting bracket. The stem and the mounting bracket can be held into position via a spring-loaded pin assembly.

The pair of C-shaped pulley support members includes a first pulley support member and a second pulley support member, each having a C-shaped portion formed at an end and further having a plurality of holes at an opposite end, for being adjustably received within an end of the center member for varying the horizontal length of the pulley support apparatus to facilitate accommodating various models of mowers. Once a desired position of each of the C-shaped pulley support members is provided, each can be held in such position via a pair of spring-loaded pin assemblies.

To serve as a mounting bracket for a first pulley, a first pulley connecting rod is inserted through an upper surface of the C-shaped portion of the first pulley support member through a lower surface of the C-shaped portion penetrating therethrough.

To facilitate frictionless, free rotation of the first pulley connecting rod, bearings are disposed on the connecting rod between an underside of the upper surface of the C-shaped portion of the first pulley support member 40 and the first pulley.

A disc-shaped lawn trimmer having lawn cutting line attached to an underside thereof is coupled to an end of the connecting rod extending below the lower surface of the C-shaped portion of the first pulley support member.

To facilitate frictionless, free rotation of the lawn trimmer about the connecting rod, bearings are disposed on the connecting rod between the lower surface of the first pulley support member and the lawn trimmer.

To serve as a mounting bracket for both a second pulley and a third pulley, a second pulley connecting rod is inserted through an upper surface of the C-shaped portion of the second pulley support member through a lower surface of the C-shaped portion and being coupled thereto. Being freely rotatable about the connecting rod, the second pulley and the third pulley are coaxially mounted on the connecting rod.

To facilitate frictionless, free rotation of the second pulley and the third pulley about the connecting rod, bearings are disposed on the connecting rod between an underside of the upper surface of the C-shaped portion of the second pulley support member and on an upper and lower side of the third pulley.

The mounting bracket has a plurality of holes peripherally aligned along its circular base for removably receiving complementary bolts of a mower deck base bracket. The mower deck base bracket has a flat, circular base being constructed of heavy steel and a plurality of complementary bolts welded perpendicularly to an upper surface of the base for engaging the holes in the circular base of the mounting bracket. The mower deck base bracket is positioned on an underside surface of a mower deck having complementary bolt receiving apertures formed therethrough for engaging the bolts of the mower deck base bracket.

Fasteners, such as nuts, are secured to the complementary bolts for locking the mounting bracket in place.

The mower deck base bracket functions as a base supporting and securing means for the mounting bracket.

To actuate the lawn trimmer, mechanical power is supplied via a mower deck pulley from a riding lawnmower.

A primary belt is operatively connected to the mower deck pulley and extends therefrom to the third pulley.

A secondary belt is operatively connected to the second pulley and extends therefrom to the first pulley.

In order to tighten any existing slack in the secondary belt, an idler pulley spring urges the secondary belt in a direction towards the center member. The idler pulley is mounted to a connecting rod which is coupled to the center member. The idler pulley is freely rotatable about the connecting rod.

Mechanical power is supplied to the mower deck pulley via a riding mower engine which actuates rotation of the mower deck pulley and in turn actuates rotation of the third pulley. Rotation of the third pulley actuates rotation of the second pulley in the direction relative to the third pulley, and in turn, the second pulley actuates rotation of the first pulley in the same direction.

Rotation of the first pulley actuates rotation of the lawn trimmer in the direction relative to the first pulley, thereby providing a means by which grass can be trimmed at the same time grass is being cut by the riding mower.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
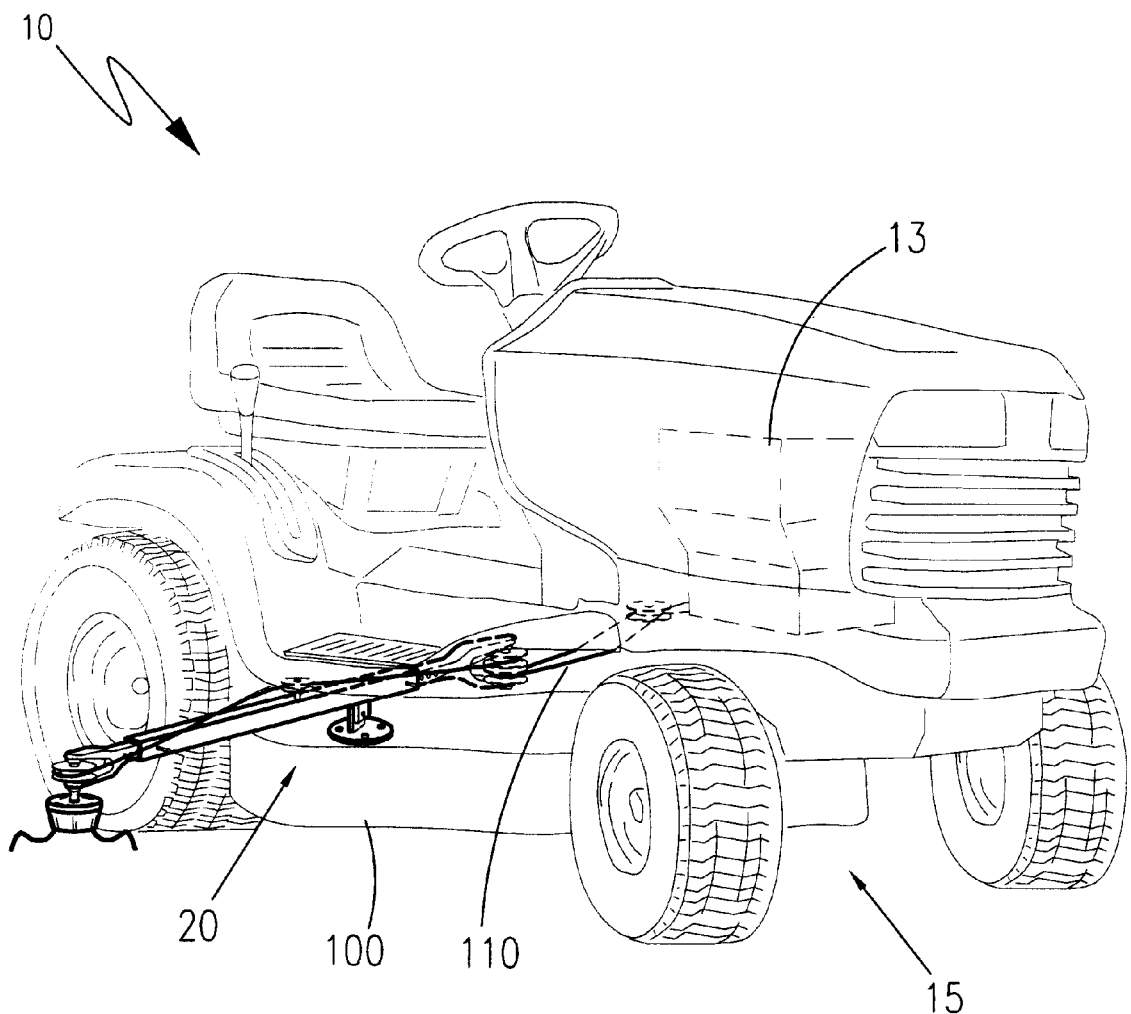
FIG. 1 is a perspective view of a lawn trimmer attachment apparatus for riding lawn mowers according to the preferred embodiment of the present invention.
Figure 2:
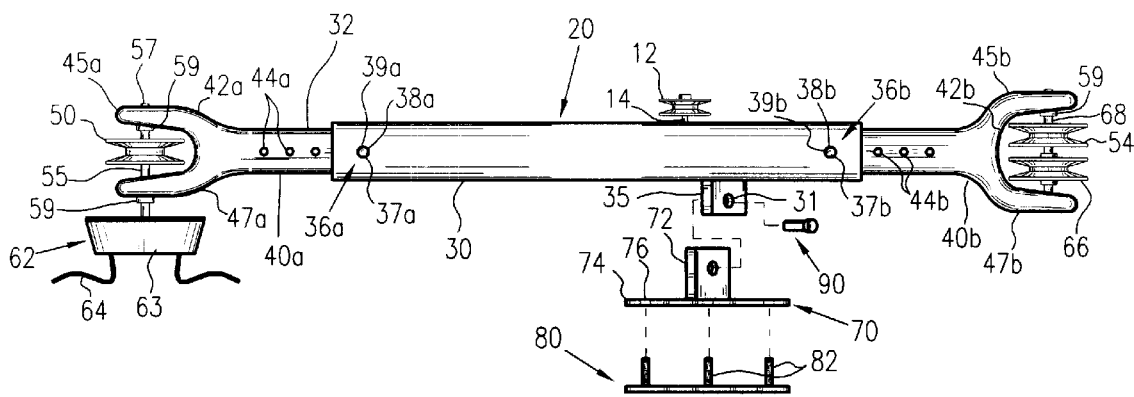
FIG. 2 is a side elevational view of the preferred embodiment of the present invention without the primary and secondary belts.
Figure 3:
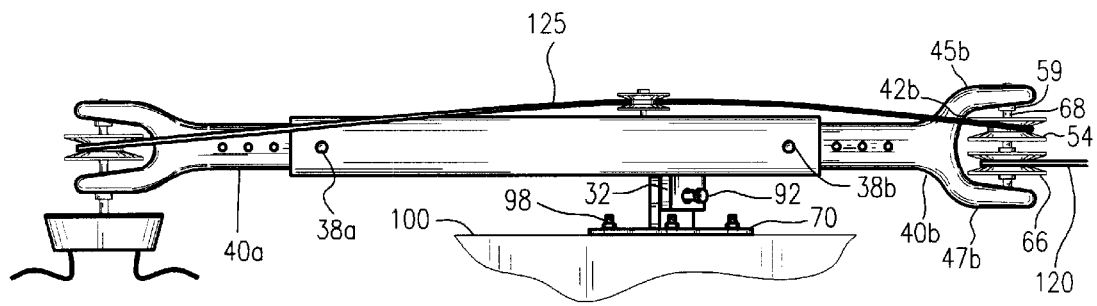
FIG. 3 is a side elevational view of the present invention attached to the mower deck of a riding mower according to the preferred embodiment of the present invention.

Referring now to FIGS. 1–6, a lawn trimmer attachment apparatus for riding lawn mowers 10 is shown, according to the present invention, comprised of a telescoping, pulley support apparatus 20 which includes a cylindrical, telescoping, T-shaped center member 30 having an anterior end 32 opposite a posterior end 34, a pair of C-shaped, telescoping, pulley support members 40 and a telescoping mounting bracket 70 being removably attachable to a mower deck 100 of a riding lawnmower 15 for functioning as a grass trimmer.

It is envisioned that various configurations of the pulley support apparatus 20 would be required for different models of riding mowers.

It is further envisioned that the present invention is constructed of a material selected from the group comprising metal.

The center member 30 includes a linearly elongated, telescoping stem 38 welded perpendicularly along a linearly elongated centerline of an underside of the center member 30 for being telescopically received by a mounting bracket 70 (as will be described in greater detail below). The center member 30 further includes a pair of spring-loaded pin assemblies 36a, 36b (as will be described in greater detail below) located at the anterior 32 and posterior ends 34 of the center member 30. An idler pulley 12 acting as a belt tensioning means (as will be described in greater detail below) is mounted to a connecting rod 14 being coupled to a horizontal upper sidewall 16 of the center member 30.

The pair of C-shaped pulley support members 40 includes a first pulley support member 40a and a second pulley support member 40b, each being of a linearly elongated, cylindrical configuration having a C-shaped portion 42a, 42b formed at an end and further having a plurality of holes 44a, 44b respectively, linearly aligned along a length at an opposite end thereof for being adjustably received within an end of the center member 30. The first pulley support member 40a is telescopically received in the anterior end 32 of the center member 30 while the second pulley support member 40b is telescopically received in the posterior end 34 of the center member 30 for varying the horizontal length of the pulley support apparatus 20 to facilitate accommodating various models of mowers.

Once a desired position of each of the C-shaped pulley support members 40a, 40b is provided, each can be held in such position via the pair of spring-loaded pin assemblies 36a, 36b respectively.

Each of the pair of spring-loaded pin assemblies 36a, 36b includes spring-loaded pins 38a, 38b respectively, of a linearly elongated configuration, being located on a vertical sidewall at the anterior end 32 and the posterior end 34 of the center member 30 which extends through holes 39a, 39b in the center member 30, positioned laterally, and capable of lateral movement via spring-loaded pin handles 37a, 37b.

The center member 30, each pulley support member 40a, 40b, and the spring-loaded pins 38a, 38b are configured such that, when the spring-loaded pins 38a, 38b are in a resting position, the center member 30 and each pulley support member 40a, 40b are locked into position by mechanical interference between the spring-loaded pins 38a, 38b extending through holes 39a, 39b in the center member 30 through holes 44a, 44b in the pulley support members 40a, 40b.

Retraction of the spring-loaded pins 38a, 38b removes the mechanical interference, thus permitting the pulley support members 40a, 40b to be extended away from or retracted into the center member 30.

To serve as a mounting bracket for a first pulley 50, a first pulley connecting rod 55 is inserted through an upper surface 45a of the C-shaped portion 42a of the first pulley support member 40a through a lower surface 47a of the C-shaped portion 42a penetrating therethrough.

The connecting rod 55 is coupled to the upper surface 45a of the C-shaped portion 42a via a bolt 57, however, other methods for attachment including clamping may be utilized. The method of attachment disclosed here is only meant as a suggestion and is in no way limiting.

To facilitate frictionless, free rotation of the first pulley connecting rod 55, bearings 57 are disposed on the connecting rod 55 between an underside of the upper surface 45a of the C-shaped portion 42a of the first pulley support member 40a and the first pulley 50.

A disc-shaped lawn trimmer 62 having lawn cutting line 64 attached to an underside thereof is coupled to an end of the connecting rod 55 extending below the lower surface 47a of the C-shaped portion 42a of the first pulley support member 40a. The lawn trimmer 62 further having a rubber skirt 63 defining a circular outer perimeter to controllably arrest the expulsion of grass clippings, weeds and other debris from the lawn trimmer 62.

To facilitate frictionless, free rotation of the lawn trimmer 62 about the connecting rod 55, bearings 59 are disposed on the connecting rod 55 between the lower surface 47a of the first pulley support member 40a and the lawn trimmer 62.

To serve as a mounting bracket for both a second pulley 54 and a third pulley 66, a second pulley connecting rod 68 is inserted through an upper surface 45b of the C-shaped portion 42b of the second pulley support member 40b through a lower surface 47b of the C-shaped portion 42b and being coupled thereto. Being freely rotatable about the connecting rod 68, the second pulley 54 and the third pulley 66 are coaxially mounted on the connecting rod 68.

The connecting rod 68 is coupled to the upper surface 45b of the C-shaped portion 42b via a bolt 57, however, other methods for attachment including clamping may be utilized. The method of attachment disclosed here is only meant as a suggestion and is in no way limiting. To facilitate frictionless, free rotation of the second pulley 54 and the third pulley 66 about the connecting rod 68, bearings 59 are disposed on the connecting rod 68 between an underside of the upper surface 45b of the C-shaped portion 42b of the second pulley support member 40b and on an upper and lower side of the third pulley 66.

For slidably receiving the stem 35 of the center member 30, a mounting bracket 70 having a flat, circular base 74 with a linearly elongated, rectangular arm 72 welded centrally and perpendicularly thereto is disclosed.

The mounting bracket 70 further having a plurality of holes 76 peripherally aligned along the circular base 74 for removably receiving complementary bolts 82 of a mower deck base bracket 80 (as will be described in greater detail below).

The stem 35 and the mounting bracket 70 can be held into position via a spring-loaded pin assembly 90.

The pin assembly 90 is designed so as to cooperate with a hole 31 in a vertical sidewall of the stem 35.

The spring-loaded pin assembly 90 includes a spring-loaded pin 92, of a linearly elongated configuration, being located on a vertical sidewall of the mounting bracket 70 which extends through a hole 94 in the mounting bracket 70, positioned laterally, and capable of lateral movement via a spring-loaded pin handle 96.

Once the stem 35 of the center member 30 has been slidably received by the mounting bracket 70, the mounting bracket 70, the stem 35 and the spring-loaded pin 92 are configured such that, when the spring-loaded pin 92 is in a resting position, the mounting bracket 70 and the stem 35 are locked into position by mechanical interference between the spring-loaded pin 92 extending through a hole 94 in the mounting bracket 70 through a hole 31 in the stem 35.

Retraction of the spring-loaded pin 92 removes the mechanical interference, thus permitting the stem 35 to be slidably removed from the mounting bracket 70.

Figure 4:
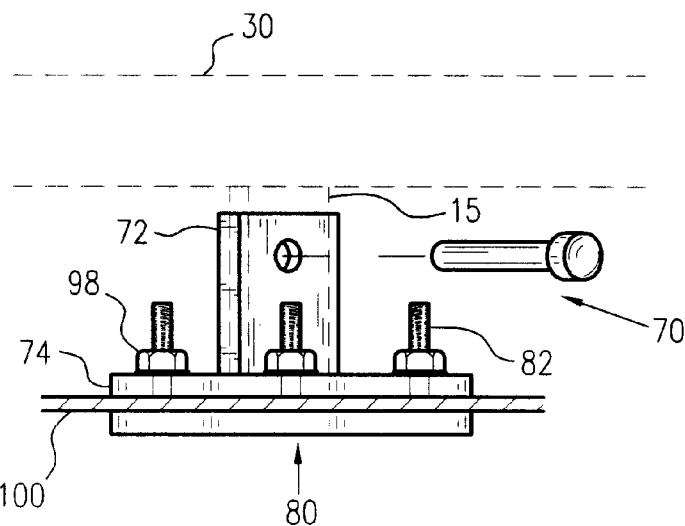
FIG. 4 is a side view of the center member shown attached to the mounting bracket.
Figure 5:
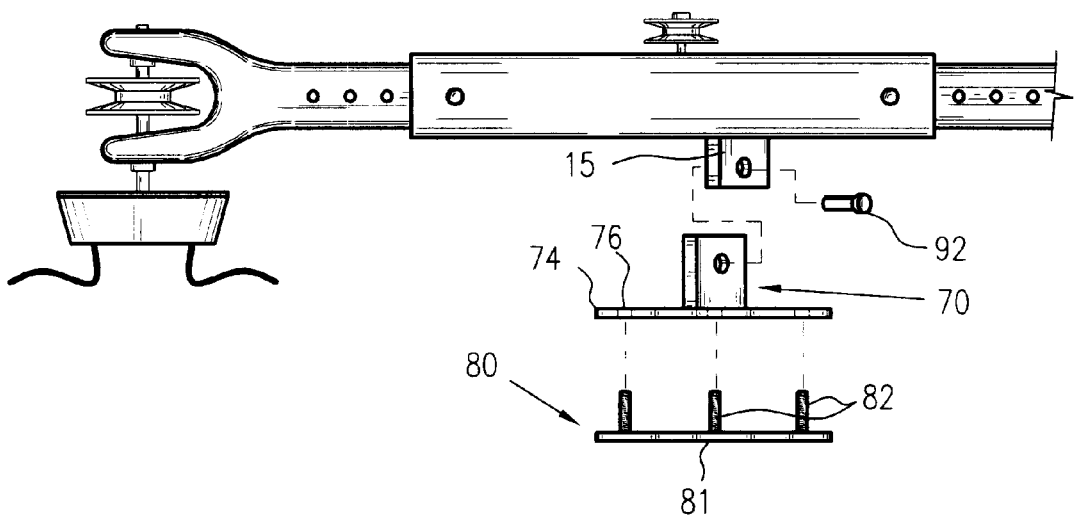
FIG. 5 is a partial exploded perspective view of the present invention as shown in FIG. 2.
Figure 6:
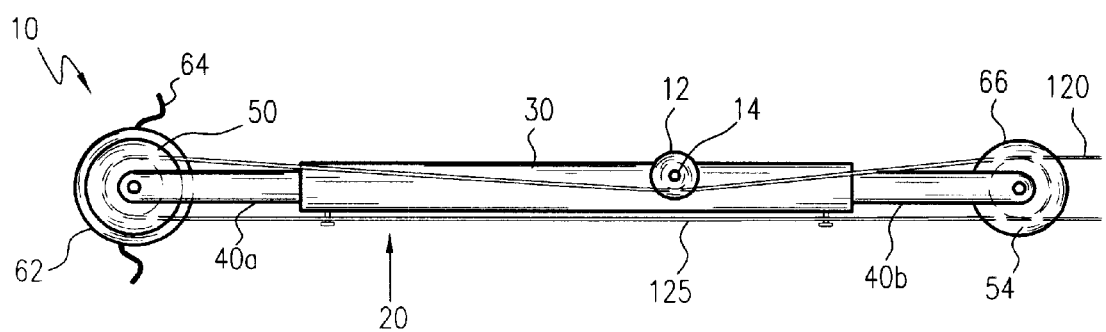
FIG. 6 is a top plan view of the present invention according to the preferred embodiment.

Referring now in greater detail in FIG. 4 and FIG. 5, a mower deck base bracket 80 having a flat, circular base 81 being constructed of heavy steel and having a plurality of complementary bolts 82 welded perpendicularly to an upper surface thereon for engaging the holes 76 in the circular base 74 of the mounting bracket 70 is disclosed.

The mower deck base bracket 80 is positioned on an underside surface of a mower deck 100 having complementary bolt receiving apertures 102 formed therethrough for engaging the bolts 82 of the mower deck base bracket 80.

Fasteners 98, such as nuts, are secured to the complementary bolts 82 for locking the mounting bracket 70 in place. However, the fastener 98 disclosed here is only meant as a suggestion and is in no way limiting.

The mower deck base bracket 80 functions as a base supporting and securing means for the mounting bracket 70. It is envisioned that the mower deck base bracket 80 can be welded to an underside surface of a mower deck 100 having complementary bolt receiving apertures 102 formed therethrough.

To actuate the lawn trimmer 62, mechanical power is supplied via a mower deck pulley 110 of a riding lawnmower 15. The mower deck pulley 110 actuates a cutting deck of a mower 15 to an active or inactive state. Thus, being supplied power via the mower deck pulley 110, the lawn trimmer is powered whenever the cutting deck is active.

A primary belt 120 is operatively connected to the mower deck pulley 110 and extends therefrom to the third pulley 66.

A secondary belt 125 is operatively connected to the second pulley 54 and extends therefrom to the first pulley 50.

In order to tighten any existing slack in the secondary belt 125, an idler pulley 12 spring urges the secondary belt 125 in a direction towards the center member 30. The idler pulley 12 is mounted to a connecting rod 14 which is coupled perpendicularly to a horizontal upper sidewall along a linearly elongated centerline of the center member 30. The idler pulley 12 is freely rotatable about the connecting rod 14.

It is envisioned that an idler pulley 12 may be configured so as to spring urge the secondary belt 125 in a direction away from the center member 30, thereby tightening any existing slack in the secondary belt 125. For purposes of this disclosure, the preferred method of spring urging the secondary belt 125 is in a direction towards the center member 30. However, either method would function equally well for tightening any existing slack in the secondary belt 125.

Mechanical power is supplied to the mower deck pulley 110 via a riding mower engine 13 which actuates rotation of the mower deck pulley 110 and in turn actuates rotation of the third pulley 66. The third pulley 66 and the second pulley 54 are coaxially connected, whereby rotation of the third pulley 66 actuates rotation of the second pulley 54 in the direction relative to the third pulley 66, and in turn, the second pulley 54 actuates rotation of the first pulley 50 in the same direction. The lawn trimmer 62 is coaxially connected to the first pulley 50, whereby rotation of the first pulley 50 actuates rotation of the lawn trimmer 62 in the direction relative to the first pulley 50, thereby providing a means by which grass can be trimmed at the same time grass is being cut by the riding mower 15.

2. Operation of the Preferred Embodiment

To use the present invention, the mower deck base bracket 80 is positioned on an underside surface of a mower deck 100 having complementary bolt receiving apertures formed therethrough for engaging the complementary bolts 82 of the mower deck base bracket 80.

Fasteners 98, such as nuts, are secured to the complementary bolts 82 for locking the mounting bracket 70 in place.

Each of the pair of pulley support members 40a, 40b are telescopically received at an end of the center member 30. Once a desired position of each of the C-shaped pulley support members 40a, 40b is provided, each can be held in such position via the pair of spring-loaded pin assemblies 36a, 36b respectively.

The stem 35 of the center member 30 is then slidably inserted into the mounting bracket 70. The stem 35 and the mounting bracket 70 are be held into position via a spring-loaded pin assembly 90.

A primary belt 120 is operatively connected to the mower deck pulley 110 and extends therefrom to the third pulley 66.

A secondary belt 125 is operatively connected to the second pulley 54 and extends therefrom to the first pulley 50.

In order to tighten any existing slack in the secondary belt 125, an idler pulley 12 spring urges the secondary belt 125 in a direction towards the center member 30.

Mechanical power is supplied to the mower deck pulley 110 via a riding mower engine 13 which actuates rotation of the mower deck pulley 110.

To actuate the lawn trimmer 62, mechanical power is supplied via the mower deck pulley 110 to the third pulley 66, the second pulley 54, the first pulley 50 and finally the lawn trimmer 62; all being operatively connected by the primary belt 120 and secondary belt 125.

The mower deck pulley 110 actuates a cutting deck of a mower 15 to an active or inactive state. Thus, being supplied power via the mower deck pulley 110, the lawn trimmer is powered whenever the cutting deck is active.

The use of the present invention provides a means by which grass trimming duties can be accomplished at the same time grass is being cut by a riding mower in a manner which is quick, easy, and effective.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A lawn trimmer attachment apparatus for riding lawn mowers comprising:

a telescoping, pulley support apparatus including a cylindrical, telescoping, T-shaped center member having an anterior end opposite a posterior end, a pair of C-shaped, telescoping, pulley support members and a telescoping mounting bracket, wherein said telescoping, pulley support apparatus is removably attachable to a mower deck of a riding lawnmower for functioning as a grass trimmer;

said center member includes a linearly elongated, telescoping stem welded perpendicularly along a linearly elongated centerline of an underside of the center member for being telescopically received by a mounting bracket;

a pair of pin assemblies located at the anterior and posterior ends of said center member; and an idler pulley acting as a belt tensioning means mounted to a connecting rod being coupled to a horizontal upper sidewall of the center member, wherein said pair of C-shaped pulley support members includes a first pulley support member and a second pulley support member, each being of a linearly elongated, cylindrical configuration having a C-shaped portion formed at an end and further having a plurality of holes, respectively, linearly aligned along a length at an opposite end thereof for being adjustably received within an end of the center member.

2. The lawn trimmer attachment apparatus for riding lawn mowers of claim 1, wherein said first pulley support member is telescopically received in the anterior end of the center member while the second pulley support member is telescopically received in the posterior end of the center member for varying the horizontal length of the pulley support apparatus to facilitate accommodating various models of mowers.

3. The lawn trimmer attachment apparatus for riding lawn mowers of claim 2, wherein the position of each of the C-shaped pulley support members is held in such position via the pair of pin assemblies.

4. The lawn trimmer attachment apparatus for riding lawn mowers of claim 3, wherein each of the pair of pin assemblies includes pins of a linearly elongated configuration, being located on a vertical sidewall at the anterior end and the posterior end of the center member which extends through holes in the center member, positioned laterally, and capable of lateral movement via spring-loaded pin handles.

5. The lawn trimmer attachment apparatus for riding lawn mowers of claim 4, wherein said center member, each said pulley support member, and each said pins are configured such that, when said pins are in a resting position, the center member and each pulley support member are locked into position by mechanical interference between said pins extending through holes in the center member through holes in the pulley support members, and wherein retraction of the pins removes any mechanical interference, thus permitting the pulley support members to be extended away from or retracted into the center member.

6. The lawn trimmer attachment apparatus for riding lawn mowers of claim 5, wherein a first pulley connecting rod is inserted through an upper surface of the C-shaped portion of the first pulley support member through a lower surface of the C-shaped portion penetrating therethrough to serve as a mounting bracket for a first pulley.

7. The lawn trimmer attachment apparatus for riding lawn mowers of claim 6, wherein said connecting rod is coupled to the upper surface of the C-shaped portion via a fastener.

8. The lawn trimmer attachment apparatus for riding lawn mowers of claim 7, further comprising a disc-shaped lawn trimmer having lawn cutting line attached to an underside thereof, said disc-shaped lawn trimmer coupled to an end of the connecting rod extending below the lower surface of the C-shaped portion of the first pulley support member.

9. The lawn trimmer attachment apparatus for riding lawn mowers of claim 8, wherein said disc-shaped lawn trimmer further comprises a rubber skirt defining a circular outer perimeter to controllably arrest the expulsion of grass clippings, weeds and other debris from the lawn trimmer.

10. The lawn trimmer attachment apparatus for riding lawn mowers of claim 9, wherein to serve as a mounting bracket for both a second pulley and a third pulley, a second pulley connecting rod is inserted through an upper surface of the C-shaped portion of the second pulley support member through a lower surface of the C-shaped portion and being coupled thereto.

11. The lawn trimmer attachment apparatus for riding lawn mowers of claim 10, wherein the second pulley and the third pulley are coaxially mounted on the connecting rod freely rotatable about the connecting rod.

12. The lawn trimmer attachment apparatus for riding lawn mowers of claim 11, wherein a mounting bracket having a flat, circular base with a linearly elongated, rectangular arm welded centrally and perpendicularly thereto for slidably receiving the stem of the center member.

13. The lawn trimmer attachment apparatus for riding lawn mowers of claim 12, wherein said mounting bracket further forms a plurality of holes peripherally aligned along the circular base for removably receiving complementary bolts of a mower deck base bracket.

14. The lawn trimmer attachment apparatus for riding lawn mowers of claim 13, further comprising a mower deck base bracket having a flat, circular base having a plurality of complementary bolts welded perpendicularly to an upper surface thereon for engaging the plurality of holes peripherally aligned along the circular base.

* * * * *